(12) United States Patent
Tomita et al.

(10) Patent No.: US 12,542,154 B2
(45) Date of Patent: Feb. 3, 2026

(54) SEALED HARD DISK DRIVE BASE INSERT

(71) Applicant: Western Digital Technologies, Inc., San Jose, CA (US)

(72) Inventors: Takashi Tomita, Yokohama (JP); Yuichi Arai, Kawasaki (JP); Yasuhiro Sakata, Fujisawa (JP); Katsuhiko Ohta, Fuchu (JP); Shuhei Nogawa, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/784,362

(22) Filed: Jul. 25, 2024

(65) Prior Publication Data

US 2026/0031103 A1    Jan. 29, 2026

(51) Int. Cl.
*G11B 5/48* (2006.01)
*G11B 19/20* (2006.01)
*G11B 33/02* (2006.01)

(52) U.S. Cl.
CPC ........ *G11B 5/4826* (2013.01); *G11B 19/2009* (2013.01); *G11B 33/022* (2013.01)

(58) Field of Classification Search
None
See application file for complete search history.

(56) References Cited

U.S. PATENT DOCUMENTS

| 5,582,411 A | 12/1996 | Tyler |
| 5,815,345 A | 9/1998 | Pelstring et al. |
| 6,204,996 B1* | 3/2001 | Macleod ............ G11B 19/2009 360/99.08 |
| 6,898,051 B2 | 5/2005 | Bahirat et al. |
| 7,031,107 B2 | 4/2006 | Kim et al. |

(Continued)

FOREIGN PATENT DOCUMENTS

| JP | 61239484 | 10/1986 |
| JP | 2011234602 | 11/2011 |

(Continued)

OTHER PUBLICATIONS

Li, Liping et al., Multi-body structural effects on the head-disk interface during operational shocks in hard disk drives, Microsyst Technol, Published Online: May 9, 2014, 8 pp, Springer-Verlag Berlin Heidelberg.

*Primary Examiner* — Peter Vincent Agustin
(74) *Attorney, Agent, or Firm* — John D. Henkhaus

(57) ABSTRACT

A hard disk drive enclosure base includes a main base composed of a first material and having at least one bottom opening therethrough, a base insert composed of a second material having a higher Young's modulus than the first material and inserted into a corresponding opening of the main base, and a friction stir weld (FSW) coupling the base insert to the main base. The base may further include a thin film sealing material between a base insert flange and the main base, which is heated by way of the FSW process and further hermetically seals the interface between the base insert and the main base. Such a base insert may be used to support with additional stiffness the spindle motor assembly and/or the actuator assembly, and provides for increasing the number of disks while maintaining sufficient rigidity in a standard form factor drive while maintaining a hermetically-sealed enclosure.

20 Claims, 7 Drawing Sheets

(56) References Cited

U.S. PATENT DOCUMENTS

| | | |
|---|---|---|
| 7,489,601 B2 | 2/2009 | Omori et al. |
| 8,587,896 B1 | 11/2013 | Ishino et al. |
| 8,667,667 B1 | 3/2014 | Nguyen et al. |
| 8,792,204 B2 | 7/2014 | Tatsumi et al. |
| 8,873,196 B2 | 10/2014 | Masumi et al. |
| 10,153,005 B1 | 12/2018 | Ayanoor-Vitikkate et al. |
| 10,399,177 B1* | 9/2019 | Coffey ............... H05K 5/04 |
| 11,065,713 B1* | 7/2021 | Lapp ................ G11B 33/148 |
| 2004/0232782 A1 | 11/2004 | Xu et al. |
| 2007/0064403 A1* | 3/2007 | Badarinarayan ... B23K 20/1265 361/796 |
| 2008/0019038 A1 | 1/2008 | Xu et al. |
| 2008/0053700 A1* | 3/2008 | O'Connor ............ B23K 20/122 174/564 |
| 2011/0309724 A1 | 12/2011 | Min et al. |
| 2011/0317310 A1 | 12/2011 | Kim et al. |
| 2013/0208415 A1 | 8/2013 | Thijssen |
| 2013/0334859 A1 | 12/2013 | Tatsumi et al. |
| 2013/0335860 A1 | 12/2013 | Masumi et al. |
| 2013/0342062 A1 | 12/2013 | Sekii et al. |
| 2013/0342934 A1 | 12/2013 | Shiraishi et al. |
| 2014/0185162 A1 | 7/2014 | Park |
| 2015/0015995 A1* | 1/2015 | Sudo ................ G11B 19/2009 29/603.03 |
| 2015/0332733 A1* | 11/2015 | Lapp ................... G11B 33/121 360/99.08 |
| 2017/0062019 A1* | 3/2017 | Severson ........... G11B 33/1486 |
| 2019/0076956 A1* | 3/2019 | Coffey ................ G06F 1/1656 |
| 2020/0038990 A1 | 2/2020 | Coffey et al. |

FOREIGN PATENT DOCUMENTS

| | | |
|---|---|---|
| JP | 2012124999 | 6/2012 |
| KR | 20080044933 A | 5/2008 |

* cited by examiner

SEALED HARD DISK DRIVE BASE INSERT

FIELD OF EMBODIMENTS

Embodiments of the invention may relate generally to hard disk drives, and particularly to approaches to increasing the rigidity of the enclosure base plate while maintaining a robust seal in a sealed hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

As networked computing systems grow in numbers and capability, there is a need for more data storage system capacity. Cloud computing and large-scale data processing further increase the need for digital data storage systems that are capable of transferring and holding significant amounts of data. To that end, increasing the storage capacity of HDDs is one of the ongoing goals of HDD technology evolution. In one form, this goal manifests in increasing the number of disks within a given HDD.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
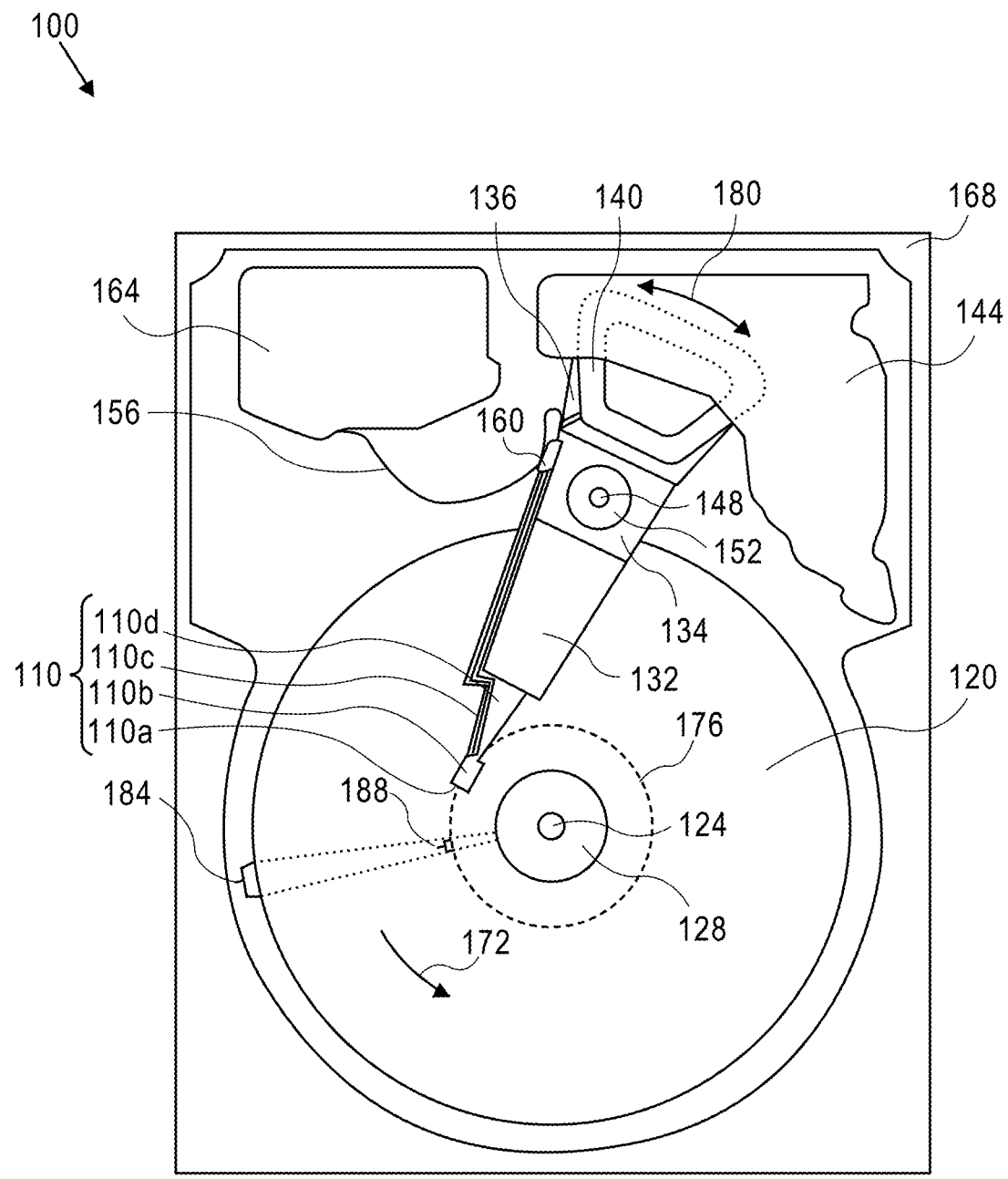
FIG. 1 is a plan view illustrating a hard disk drive (HDD), according to an embodiment.

Generally, approaches to increasing or maintaining the rigidity of a thinner enclosure base plate while maintaining a robust seal in a sealed hard disk drive (HDD) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free.

Context

Recall that increasing the storage capacity of hard disk drives ("HDDs", or simply "drive") is one of the on-going goals of HDD technology evolution, and that increasing the number of recording disks to provide more disk storage area is one approach to increasing overall storage capacity. However, oftentimes maintaining a standard form factor is required, as characterized in part by the z-height of an HDD, which inherently provides challenges with respect to fitting more disks into a given HDD. More particularly, customer specifications and/or common design and operational constraints include operational shock (or "op-shock") requirements, which generally relate to an HDD's operational tolerance of a mechanical shock event. Furthermore, the ability of the servo system to position the read-write head on, and to follow around for a disk revolution (e.g., "track following") the target tracking position (the "track center"), may be affected by many factors including drive disturbances such as internal and external operational vibration ("op-vibe") events or occurrences.

Thus, it remains a challenge to increase the number of disks while maintaining a standard form factor, while also reliably meeting op-shock and op-vibe requirements. For example, one issue that may arise with increasing the number of disks in a standard form factor drive is that a thinner enclosure base plate (e.g., thinner floor) may be implemented to provide more available z-height to pack more disks and corresponding actuator arms within the drive enclosure. Operation of an HDD requires operation of both a disk spindle motor and a head stack assembly (HSA) actuator, both of which are in some way mechanically coupled with the base plate, One approach considered for meeting design and operational requirements is to use a high stiffness material such as steel for the base plate, however steel is difficult to cast in mass volume and requires longer post-cast machining time due to it being a harder material.

Another approach to meeting requirements involves the insertion of a different material to connect to the base plate in the area of the disk spindle motor and/or actuator assembly to increase the rigidity of each motorized system. FIG. 2 is a cross-sectional side view diagram illustrating motorized systems of an HDD. HDD 200 comprises a disk spindle motor system 202 and an HSA actuator system 204, housed within an HDD enclosure 206 comprising a base 206a (or "enclosure base" or "base plate"; see, e.g., housing 168 of FIG. 1), typically cast aluminum, and a cover 206b. Here, the motor shaft 203a of spindle motor 203 of disk spindle motor system 202 may be composed of steel, rather than aluminum like for the base 206a. Similarly, the pivot shaft 205a of pivot 205 of actuator system 204 may also be composed of steel, rather than aluminum like the base 206a. However, such steel shaft inserts 203a, 205a have a relatively small mechanical interface with the base 206, and are not structurally integral with the base 206, and therefore may be insufficient in providing desired base plate stiffness. Hence, the robustness of both motorized systems, e.g., the disk spindle motor system 202 and the actuator system 204, may be degraded with an aforementioned thinner less rigid base plate.

Continuing, another approach to this issue of base rigidity involves the insertion of a higher Young's modulus (i.e., a mechanical property of solid materials that characterizes the tensile or compressive stiffness, e.g., defined as the ratio of tensile stress to tensile strain) support structure into the base plate in the area of the disk spindle motor and/or actuator assembly, to locally increase the rigidity of the base plate. However, high-capacity HDDs (e.g., such as those used in data centers) are now more likely to be hermetically-sealed drives operating in an internal lighter-than-air gas (e.g., helium, for a non-limiting example), from a total cost of ownership (TCO) viewpoint. There are various benefits to sealing and operating an HDD in helium ambient, for example, because the density of helium is one-seventh that of air. Hence, operating an HDD in helium reduces the drag force acting on the spinning disk stack and the mechanical power used by the disk spindle motor. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. However, a rigid structure inserted into a base plate casting results in potential new leakage paths. In view of the foregoing, it remains a challenge to increase the number of disks while maintaining sufficient rigidity in a standard form factor drive, while maintaining an effective hermetically-sealed enclosure.

High Stiffness Material Insert(S) into Baseplate

Figure 3:
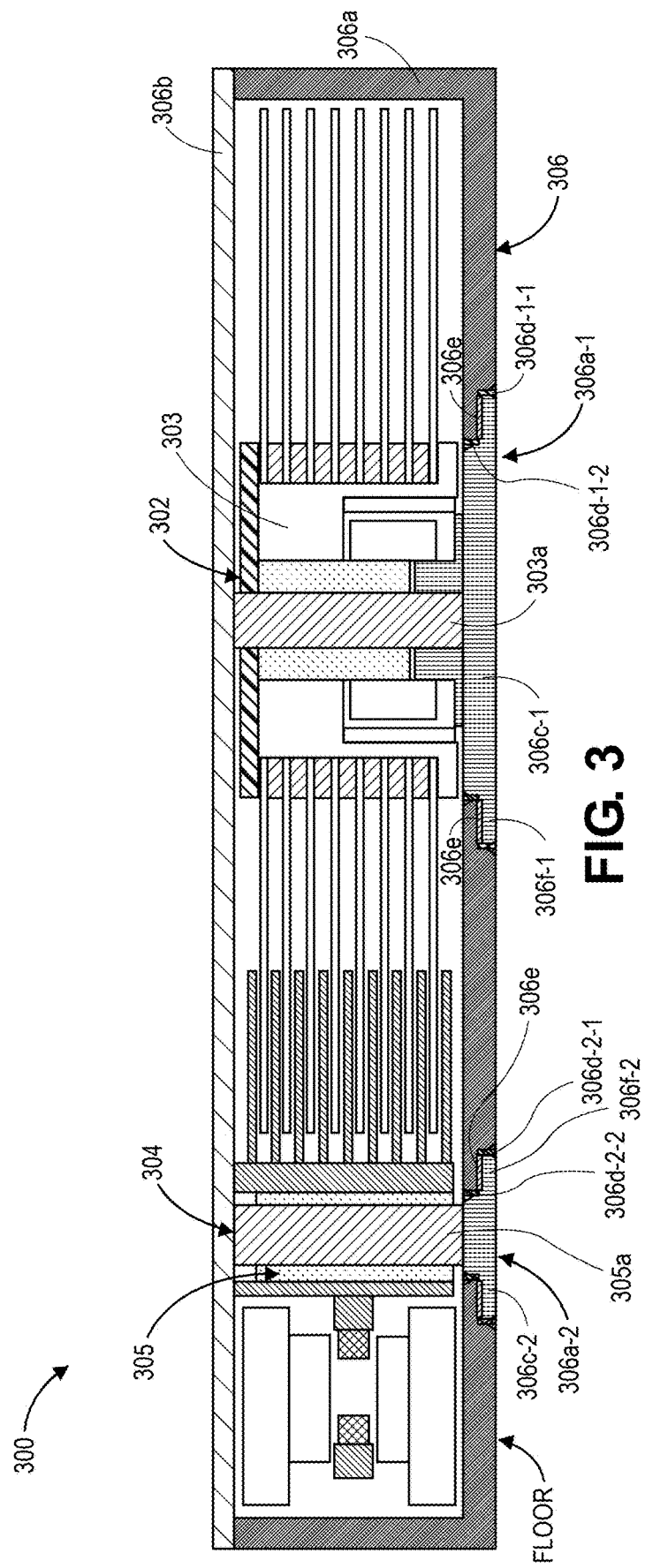
FIG. 3 is a cross-sectional side view diagram illustrating an HDD, according to an embodiment.

FIG. 3 is a cross-sectional side view diagram illustrating an HDD, according to an embodiment. HDD 300 comprises a disk spindle motor assembly 302 and an HSA actuator assembly 304 ("actuator assembly 304"), housed within an HDD enclosure 306 comprising a main base 306a (or "enclosure base" or "base plate"), typically cast aluminum, and a cover 306b. A motor shaft 303a of spindle motor 303 of disk spindle motor assembly 302 may be composed of steel, rather than aluminum like for the main base 306a. Similarly, the pivot shaft 305a of pivot 305 of actuator assembly 304 may also be composed of steel, rather than aluminum like the main base 306a. According to at least one embodiment, the main base 306a is composed of a first material and includes at least one bottom opening therethrough, here illustrated as first opening 306a-1 and second opening 306a-2. Enclosure 306 further comprises at least one base insert, here illustrated as first base insert 306c-1 and second base insert 306c-2, each composed of a second material having a higher Young's modulus (e.g., stiffer) than the first material, inserted into a corresponding bottom opening 306a-1, 306a-2 of the main base 306a. For example, the main base 306a may be composed of aluminum/aluminum alloy and each base insert 306c-1, 306c-2 composed of steel/steel alloy.

According to at least one embodiment, each base insert 306c-1, 306c-2 comprises a respective flange 306f-1, 306f-2 structure for increased strength for mitigating effect(s) of external shock and vibration. According to at least one embodiment, base insert 306c-1 is positioned under and coupled with the motor shaft 303a of the spindle motor assembly 302. According to at least one embodiment, base insert 306c-2 is positioned under and coupled with the pivot shaft 305a of the HSA actuator assembly 304. According to at least one embodiment and as depicted in FIG. 3, base insert 306c-1 is positioned under and coupled with the motor shaft 303a of the spindle motor assembly 302 and base insert 306c-2 is positioned under and coupled with the pivot shaft 305a of the HSA actuator assembly 304.

Enclosure 306 further comprises a friction stir weld (FSW), here illustrated as FSW 306d-1-1 and FSW 306d-1-2 for the first base insert 306c-1 and as FSW 306d-2-1 and FSW 306d-2-2 for the second base insert 306c-2, coupling each of the at least one base insert 306c-1, 306c-2 to the main base 306a. Generally, an FSW such as FSW 306d-1-1, FSW 306d-1-2, FSW 306d-2-1, FSW 306d-2-2 is produced by friction stir welding, a joining process considered of very high weld strength which employs a tool for joining parts by generating heat through friction between a rotating tool and the subject part material(s), which softens the areas near the tool and mechanically intermixes the two pieces of metal, effectively by forging the hot and softened metals. According to at least one embodiment, base insert 306c-1 comprises a flange 306f-1 having an outer diameter (e.g., of the thinner outer portion) at which (arbitrarily, "first") FSW 306d-1-1 is generated at the outer interface of the flange 306f-1 and the main base 306a at opening 306a-1, and an inner diameter (e.g., of the thinner outer portion) at which (arbitrarily, "second") FSW 306d-1-2 is generated at the inner interface of the flange 306f-1 and the main base 306a at opening 306a-1. Similarly and according to at least one embodiment, base insert 306c-2 comprises a flange 306f-2 having an outer diameter at which (arbitrarily, "first") FSW 306d-2-1 is generated at the outer interface of the flange 306f-2 and the main base 306a at opening 306a-2, and an inner diameter at which (arbitrarily, "second") FSW 306d-2-2 is generated at the inner interface of the flange 306f-2 and the main base 306a at opening 306a-2.

Figure 4:
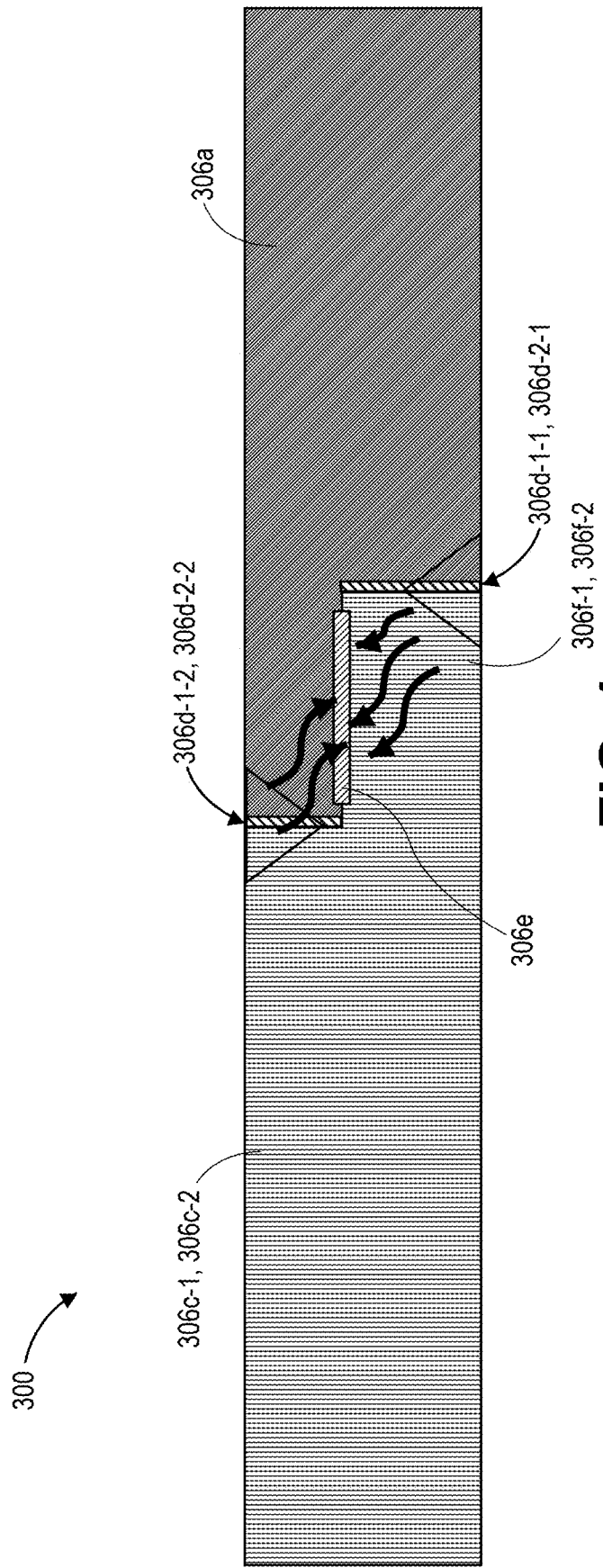
FIG. 4 is a cross-sectional side view diagram illustrating an attachment approach for the HDD of FIG. 3, according to an embodiment.

At least in part because the flange shape of each of the at least one base insert(s) 306c-1, 306c-2 is relatively large, it may be difficult to join, couple, attach each entire interface by friction stir welding only, as there may remain some risk of gap at flange 306f-1, 306f-2 area between each base insert 306c-1, 306c-2 and main base 306a. According to at least one embodiment, to eliminate this gap risk a thin film is inserted and utilized on the flange area between a base insert and the main base. FIG. 4 is a cross-sectional side view diagram illustrating an attachment approach for the HDD of FIG. 3, according to an embodiment. Illustrated in FIG. 4 is an interface between main base 306a and a representative base insert 306c-1, 306c-2, further depicting FSW 306d-1-1, 306d-2-1 at the outer diameter of the base insert flange 306f-1, 306f-2 and FSW 306d-1-2, 306d-2-2 at the inner diameter of the base insert flange 306f-1, 306f-2, as described in more detail elsewhere herein. According to at least on embodiment, enclosure 300 further comprises a sealing material 306e between at least a portion of the flange 306f-1, 306f-2 of a corresponding base insert 306c-1, 306c-2 and the main base 306a. For example, sealing material 306e may be implemented as a thin film material which can be molten at a lower temperature than steel and aluminum. For example and according to embodiments, the sealing material may be selected from at least one of a lead-free solder, a brazing material, and a thermoplastic resin. Such thin film sealing material 306e can be made molten by heat residue from FSW process (represented by squiggly arrows) and this molten material fills any gap and further welds, joins, couples, attaches one or both base insert 306c-1, 306c-2 with the main base plate 306a. Preferably and according to an embodiment, the thickness of the thin film sealing material 306e (as applied, prior to heating) should be thinner (e.g., less than 0.1 mm for a non-limiting example), its shape annular, and its size should be smaller than the corresponding flange 306f-1, 306f-2 radius.

Disk Windage Loss Reduction

Figure 5A:
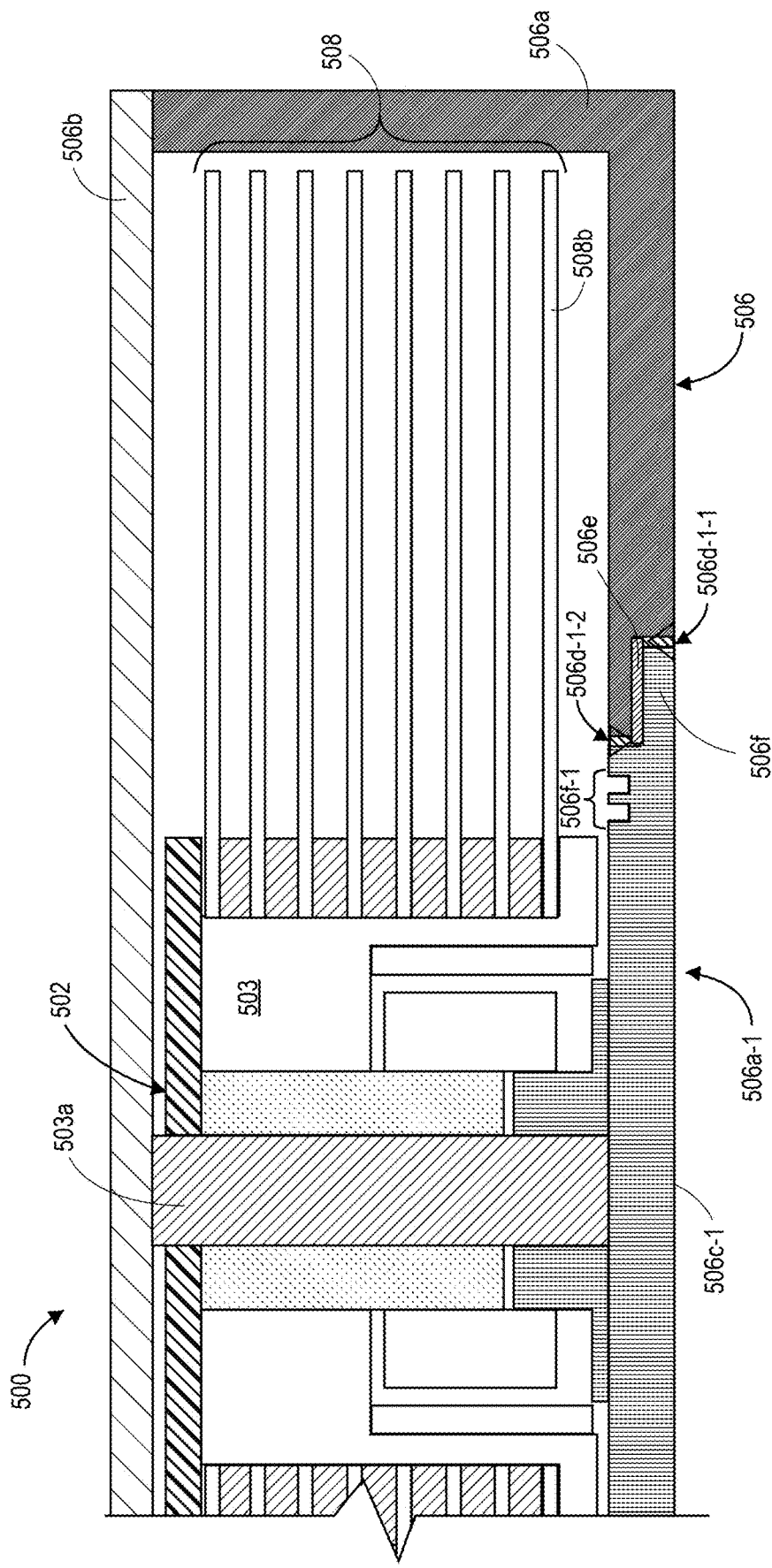
FIG. 5A is a cross-sectional side view diagram illustrating an HDD, according to an embodiment.

FIG. 5A is a cross-sectional side view diagram illustrating an HDD, according to an embodiment. Similarly to HDD 300 of FIGS. 3-4, HDD 500 comprises a disk spindle motor assembly 502 housed within an HDD enclosure 506 comprising a main base 506a, typically cast aluminum, and a cover 506b. A motor shaft 503a of spindle motor 503 of disk spindle motor assembly 502 may be composed of steel, rather than aluminum like for the main base 506a. As with HDD 300, according to at least one embodiment the main base 506a is composed of a first material and includes at least one bottom opening therethrough, here illustrated as first opening 506a-1. Enclosure 506 further comprises at least one base insert, here illustrated as base insert 506c-1 composed of a second material having a higher Young's modulus (e.g., stiffer) than the first material, inserted into the corresponding bottom opening 506a-1 of the main base 306a. For example, the main base 506a may be composed of aluminum/aluminum alloy and each base insert 506c-1 composed of steel/steel alloy. Here too base insert 506c-1 is configured with a flange structure for increased strength for mitigating effect(s) of external shock and vibration, and base insert 506c-1 is positioned under and coupled with the motor shaft 503a of the spindle motor assembly 502. Note that enclosure 506 of HDD 500 may further comprise a second base insert such a base insert 306c-2 (FIG. 3) positioned under and coupled with a pivot shaft such as pivot shaft 305a (FIG. 3) of the HSA actuator assembly 304 (FIG. 3). Similarly to HDD 300 of FIGS. 3-4, the enclosure 506 further comprises a friction stir weld (FSW) at each of the outer diameter and inner diameter of the flange (e.g., the thinner outer portion of the flange 506f), here illustrated as FSW 506d-1-1 and FSW 506d-1-2 respectively, coupling base insert 506c-1 to the main base 506a. Here also and according to at least one embodiment, a thin film sealing material 506e is utilized on the outer flange area between base insert 506c-1 and the main base 506a. Here also sealing material 506e may have the same attributes described in reference to sealing material 306e (FIGS. 3-4).

"Windage" generally refers to the air resistance of, or the retarding force of air friction on, a moving object. In the context of an HDD, windage often refers to the effect of air/gas resistance imparted to a spinning disk based on nearby structures. For example, tight disk clearances corresponding to the HDD enclosure and disk shroud structures create more windage drag which requires the spindle motor to use more power. Thus, reducing windage-based power loss ("windage loss") is typically considered beneficial. Noteworthy to HDD 500, according to at least one embodiment the base insert 506c-1 comprises a portion extending beyond the spindle motor assembly 502 to underneath a disk stack 508, where the portion comprises one or more groove 506f-1 in the portion surface facing the bottom disk 508b. Therefore, disk windage loss can be reduced by having a larger gap between the bottom disk 508b and the base insert 506c-1. As depicted, flange 506f may extend even further radially underneath disk stack 508, providing surface(s) for joining, bonding, coupling with surfaces of main base 506.

Figure 5B:
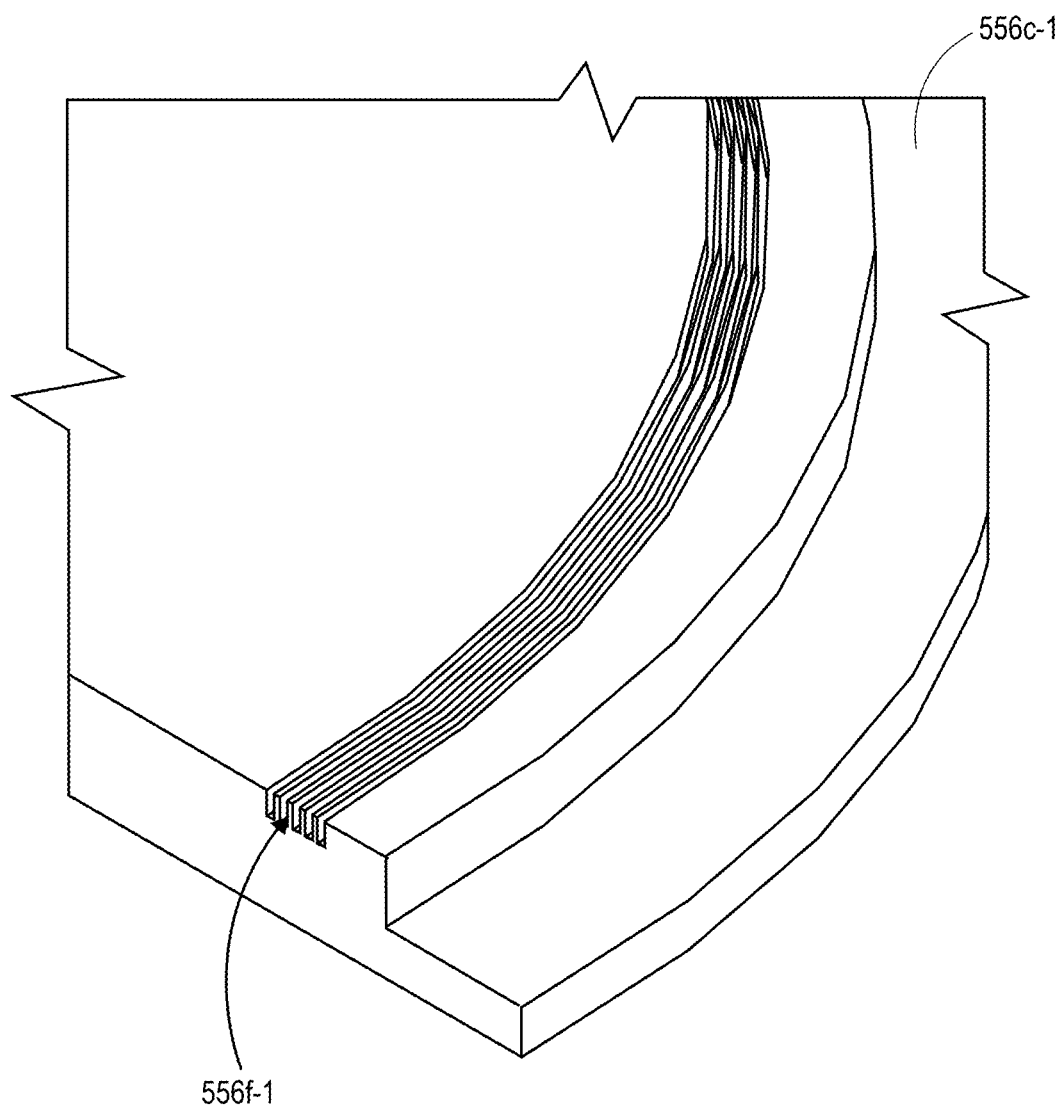
FIG. 5B is a perspective view illustrating a base insert for the HDD of FIG. 5A, according to an embodiment.

FIG. 5B is a perspective view illustrating a base insert for the HDD of FIG. 5A, according to an embodiment. Base insert 556c-1 illustrates an example implementation of the base insert 506c-1 of FIG. 5A, depicting a set of five annular grooves 556f-1 etched, machined, or otherwise formed around the annular base insert 556c-1, rather than the simplified view of FIG. 5A depicting a set of two grooves for base insert 506c-1. Note that the number of grooves formed in a given base insert may vary from implementation to implementation based, for non-limiting examples, on design goals and operational parameters, fabrication processes, costs and the like. Alternatively to comprising the one or more groove 506f-1, 556f-1 in base insert 506c-1, 556c-1, a simple gap or recess may be implemented and formed into a base insert such as base insert 506c-1, 556c-1, facing the bottom disk 508b surface, for windage loss reduction purposes.

Method of Manufacturing a Hard Disk Drive Enclosure Base

Figure 6:
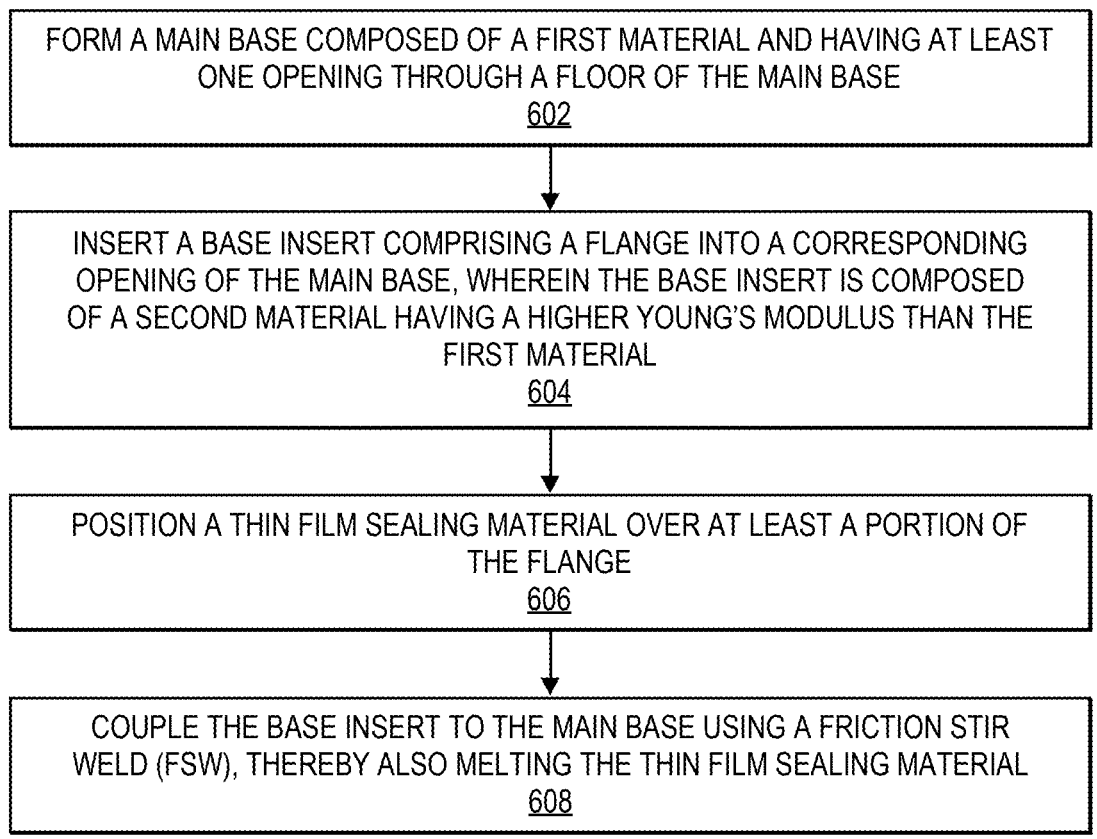
FIG. 6 is a flowchart illustrating a method of manufacturing a hard disk drive enclosure base, according to an embodiment.

FIG. 6 is a flowchart illustrating a method of manufacturing a hard disk drive enclosure base, according to an embodiment. For example, the manufacturing method of FIG. 6 may be used to manufacture an HDD enclosure base such as base 306 (FIGS. 3-4), 506 (FIG. 5A).

At block 602, form a main base composed of a first material and having at least one opening through a floor of the main base. For example, main base 306a (FIGS. 3-4) having a first opening 306a-1 (FIGS. 3-4) and/or second opening 306a-2 (FIGS. 3-4), or main base 506a (FIG. 5A) having a first opening 506a-1 (FIG. 5A) (and/or a second opening such as 306a-2) is cast from aluminum.

At block 604, insert a base insert comprising a flange into a corresponding opening of the main base, wherein the base insert is composed of a second material having a higher Young's modulus than the first material. For example, first base insert 306c-1 (FIGS. 3-4) and/or second base insert 306c-2 (FIGS. 3-4) composed of steel (for a non-limiting example, fabricated from steel plate) is inserted into a corresponding first opening 306a-1, second opening 306a-2 of main base 306a. For another example, first base insert 506c-1 (FIGS. 5A-5B) (and/or a second base insert such as 306c-2) composed of steel (for a non-limiting example, fabricated from steel plate) is inserted into a corresponding first opening 506a-1 (and/or a second opening such as 306a-2) of main base 506a.

At block 606, position a thin film sealing material over at least a portion of the flange. For example, a thin film of sealing material 306e (FIGS. 3-4), 506e (FIG. 5A) is positioned over at least a portion of the flange 306f-1, 306f-2, 506f of base insert 306c-1, 306c-2, 506c-1.

At block 608, couple the base insert to the main base using a friction stir weld (FSW), thereby melting the thin film sealing material. For example, base insert 306c-1, 306c-2, is joined with the corresponding main base 306a by way of FSW 306d-1-1, 306d-1-2, 306d-2-1, 306d-2-2 (FIGS. 3-4), thereby melting the sealing material 306e and further hermetically sealing each base insert 306c-1, 306c-2 to the main base 306a. For another example, base insert 506c-1 (and/or a second base insert such as 306c-2) is joined with the corresponding main base 506a by way of an 506d-1-1, 506d-1-2 (FIG. 5), thereby melting the sealing material 506e and further hermetically sealing each base insert 506c-1 to the main base 506a.

Further, an HDD spindle motor assembly may be coupled to the first base insert and a head stack assembly actuator assembly may be coupled to the second base insert. For example, HDD spindle motor assembly 302 (FIG. 3) may be coupled to the first base insert 306c-1 and a head stack assembly actuator assembly 304 (FIG. 3) may be coupled to the second base insert 306c-2.

Hence, an HDD enclosure base as described herein throughout, comprising stiff insert structure(s) for supporting one or both of the motorized systems, and being robustly sealed to the main baseplate via friction stir welds and thin film sealing material at the interfaces, provides an approach for increasing the number of disks while maintaining sufficient rigidity in a standard form factor drive, while maintaining an effective hermetically-sealed enclosure.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 2:
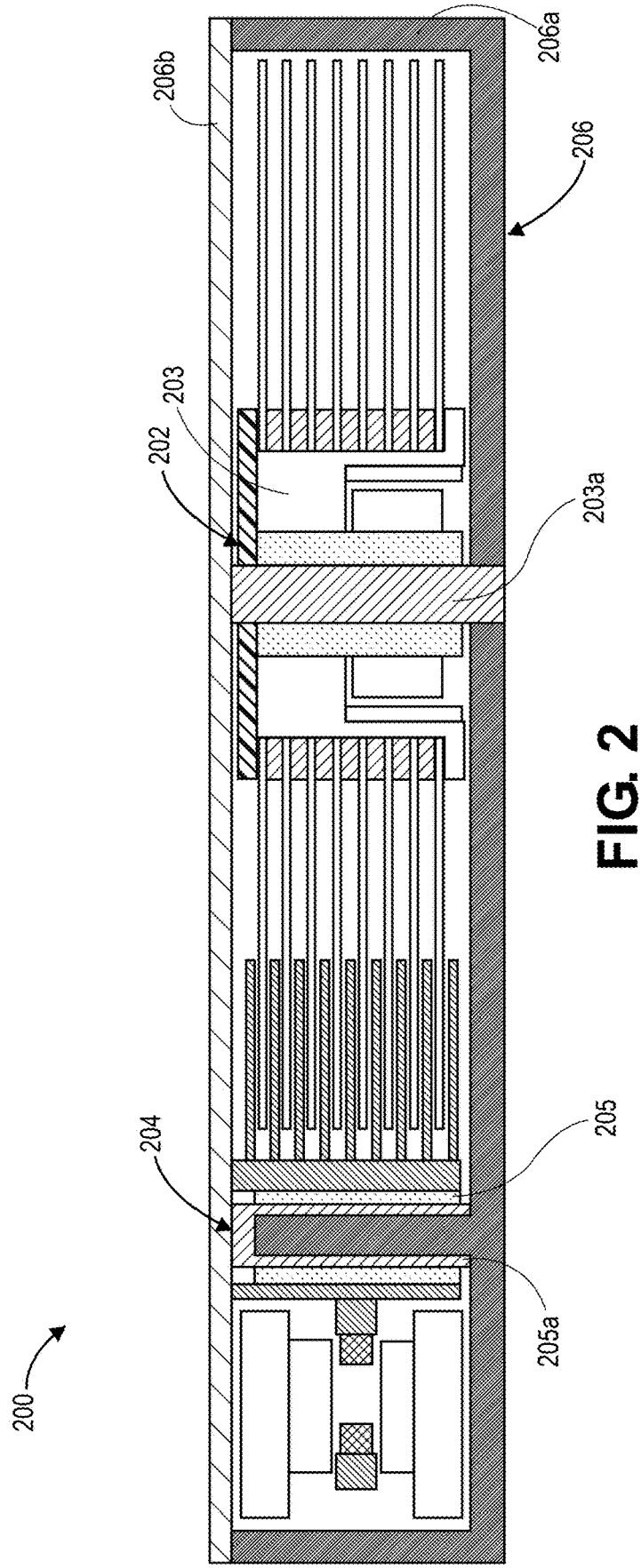
FIG. 2 is a cross-sectional side view diagram illustrating motorized systems of an HDD.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "base plate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
a disk medium rotatably mounted on a spindle;
a spindle motor assembly configured to rotate the spindle on which the disk medium is mounted;
a head slider housing a read-write transducer configured to read from and to write to the disk medium;
a head stack assembly (HSA) actuator assembly configured for moving the head slider to access portions of the disk medium; and
an enclosure comprising:
a main base composed of a first material and having at least one bottom opening therethrough,
a base insert, composed of a second material having a higher Young's modulus than the first material, inserted into a corresponding bottom opening of the main base, wherein the base insert comprises a flange portion having an inner diameter and an outer diameter, and
a friction stir weld (FSW) coupling the base insert to the main base,
wherein the FSW comprises:
a first weld at an interface of the inner diameter of the flange portion and the main base, and
a second weld at an interface of the outer diameter of the flange portion and the main base.

2. The HDD of claim 1, wherein the base insert is positioned under and coupled with a motor shaft of the spindle motor assembly.

3. The HDD of claim 2, wherein the base insert comprises a portion extending beyond the spindle motor assembly, the portion comprising one or more grooves in a surface facing the disk medium.

4. The HDD of claim 1, wherein the base insert is positioned under and coupled with a pivot shaft of the HSA actuator assembly.

5. The HDD of claim 1, wherein:
- a first base insert is positioned under and coupled with a motor shaft of the spindle motor assembly; and
- a second base insert is positioned under and coupled with a pivot shaft of the HSA actuator assembly.

6. The HDD of claim 1, wherein
the enclosure further comprises a sealing material between at least a portion of the flange portion and the main base.

7. The HDD of claim 6, wherein the sealing material comprises a thin film of one material from a group consisting of lead-free solder, brazing material, and thermoplastic resin.

8. The HDD of claim 6, wherein the sealing material is composed of a material having a lower melting point than the main base and the base insert such that the sealing material is molten by heat from fabrication of the FSW.

9. A hard disk drive (HDD) enclosure comprising:
- a main base composed of a first material and having at least one floor opening therethrough;
- a base insert, composed of a second material having a higher Young's modulus than the first material, inserted into a corresponding floor opening of the main base, wherein the base insert comprises a flange portion having an inner diameter and an outer diameter; and
- weld means coupling the base insert to the main base, wherein the weld means comprises:
  - a first friction stir weld at an interface of the inner diameter of the flange portion and the main base, and
  - a second friction stir weld at an interface of the outer diameter of the flange portion and the main base.

10. The HDD enclosure of claim 9, wherein the base insert is configured for positioning under an HDD spindle motor assembly.

11. The HDD enclosure of claim 10, wherein the base insert comprises a portion comprising one or more grooves in a top surface of the portion and configured for positioning under an HDD disk medium.

12. The HDD enclosure of claim 9, wherein the base insert is configured for positioning under a head stack assembly actuator assembly.

13. The HDD enclosure of claim 9, wherein:
- a first base insert is configured for positioning under an HDD spindle motor assembly; and
- a second base insert is configured for positioning under a head stack assembly actuator assembly.

14. The HDD enclosure of claim 9, wherein
the enclosure further comprises a sealing material between at least a portion of the flange portion and the main base.

15. The HDD enclosure of claim 14, wherein the sealing material comprises a thin film of one material from a group consisting of lead-free solder, brazing material, and thermoplastic resin.

16. A hard disk drive comprising the HDD enclosure of claim 9.

17. A method of manufacturing a hard disk drive (HDD) enclosure base,
the method comprising:
- forming a main base composed of a first material and having at least one opening through a floor of the main base;
- inserting a base insert comprising a flange into a corresponding opening of the main base, wherein the base insert is composed of a second material having a higher Young's modulus than the first material;
- positioning a thin film sealing material over at least a portion of the flange; and
- coupling the base insert to the main base using a friction stir weld (FSW), thereby melting the thin film sealing material.

18. The method of claim 17, wherein:
inserting the base insert comprises inserting a first base insert into a corresponding first opening of the main base and inserting a second base insert into a corresponding second opening of the main base, wherein the flange of each base insert comprises an inner diameter and an outer diameter; and
coupling each base insert to the main base includes forming a first FSW at an interface of the inner diameter of the respective flange and the main base and forming a second FSW at an interface of the outer diameter of the respective flange and the main base;
the method further comprising:
- coupling an HDD spindle motor assembly to the first base insert; and
- coupling a head stack assembly actuator assembly to the second base insert.

19. The method of claim 18, wherein the first base insert comprises a portion comprising one or more grooves in a top surface of the portion and configured for positioning under an HDD disk medium.

20. The method of claim 17, wherein positioning the thin film sealing material includes positioning a thin film of a material from a group consisting of lead-free solder, brazing material, and thermoplastic resin.

* * * * *